United States Patent
Kollia et al.

(10) Patent No.: US 11,780,656 B2
(45) Date of Patent: Oct. 10, 2023

(54) PRODUCT WITH A NON-ALCOHOL DRINK AND METHOD FOR PRESERVING SAID DRINK

(71) Applicant: SERVE STERILE PC, Athens (GR)

(72) Inventors: Maria Kollia, Rea Drosia (GR); Emmanouil Smyrlakis, Rea Drosia (GR)

(73) Assignee: SERVE STERILE PC, Athens (GR)

( * ) Notice: Subject to any disclaimer, the term of this patent is extended or adjusted under 35 U.S.C. 154(b) by 121 days.

(21) Appl. No.: 17/150,138

(22) Filed: Jan. 15, 2021

(65) Prior Publication Data

US 2021/0362916 A1 Nov. 25, 2021

(30) Foreign Application Priority Data

May 25, 2020 (EP) .................................... 20176241

(51) Int. Cl.
*B65D 47/06* (2006.01)
*A23L 2/02* (2006.01)
(Continued)

(52) U.S. Cl.
CPC ............... *B65D 47/06* (2013.01); *A23L 2/02* (2013.01); *A23L 2/44* (2013.01); *B01D 39/1676* (2013.01);
(Continued)

(58) Field of Classification Search
CPC .... B65D 39/06; B65D 47/2031; B65D 47/06; B65D 47/32; B65D 51/1616;
(Continued)

(56) References Cited

U.S. PATENT DOCUMENTS 5,431,205 A * 7/1995 Gebhard .............. B67D 3/0032
141/351
6,230,944 B1 5/2001 Castellano et al.
(Continued)

FOREIGN PATENT DOCUMENTS

CA            2806512 A1 *  2/2012  ............. B65D 47/18
WO     WO-2012014050 A2 *  2/2012  ............. B65D 47/18

OTHER PUBLICATIONS

Translation of CA2806512A1. Defemme et al., Feb. 2, 2012, pp. 5 and 7. (Year: 2012).*

(Continued)

*Primary Examiner* — Robert J Hicks
(74) *Attorney, Agent, or Firm* — Maier & Maier, PLLC

(57) ABSTRACT

A product including a bottle with a mouth; a drink inside the bottle, the drink including a version of an alcoholic drink, where there is no alcohol or there is alcohol at a concentration by volume less than 1.5%; a pourer attached to the mouth and having a flow channel, a check valve, an air-vent channel and a filter, where the flow channel and the check valve allow via the same a flow of the non-alcoholic drink towards outside the product, the air-vent channel allows air to pass inside the bottle, and the filter produces a filtration of the air passing inside the bottle via the air-vent channel, the drink being any of a non-alcoholic drink, an alcohol substitute drink, a low alcohol drink, an alcohol free drink, or a de-alcoholized drink. Also, a method for extending the lifetime of a non-alcoholic drink, related to making the drink.

14 Claims, 2 Drawing Sheets

(51) Int. Cl.
*A23L 2/44* (2006.01)
*B01D 39/16* (2006.01)
*B65D 47/32* (2006.01)
*B65D 51/16* (2006.01)
*B67C 3/28* (2006.01)

(52) U.S. Cl.
CPC ......... *B65D 47/32* (2013.01); *B65D 51/1616* (2013.01); *B67C 3/28* (2013.01); *B01D 2201/18* (2013.01); *B01D 2275/30* (2013.01)

(58) Field of Classification Search
CPC ............... B65D 51/1605; B65D 51/16; B65D 51/1644; B65D 51/1661; B67C 3/28; A23L 2/02; A23L 2/44; A23L 2/42; B01D 39/1676; B01D 39/1669; B01D 39/16
USPC .................. 215/312, 311, 307, 44, 43, 308; 220/203.21, 203.19, 372, 371, 367.1; 222/547, 568
See application file for complete search history.

(56) References Cited

U.S. PATENT DOCUMENTS

| | | | |
|---|---|---|---|
| 2005/0263479 A1 | 12/2005 | Smolko et al. | |
| 2011/0186536 A1 | 8/2011 | Wurster et al. | |
| 2015/0320638 A1 | 11/2015 | Becker et al. | |
| 2017/0081093 A1* | 3/2017 | Fisch | B65D 51/1616 |
| 2020/0262622 A1* | 8/2020 | Wochele | B65D 47/2062 |
| 2020/0270028 A1* | 8/2020 | Antonelli | B65D 47/06 |
| 2022/0274746 A1* | 9/2022 | Bull | B65D 47/2075 |
| 2022/0379623 A1* | 12/2022 | McCourt | B65D 47/2031 |

OTHER PUBLICATIONS

Extended European Search Report dated Oct. 23, 2020 in corresponding European application No. 20176241.6; 7 pages.

* cited by examiner

PRODUCT WITH A NON-ALCOHOL DRINK AND METHOD FOR PRESERVING SAID DRINK

TECHNICAL FIELD

The present invention is directed, in general, to the field of alcohol substitute drinks or non-alcoholic drinks and methods for preserving said non-alcoholic or alcohol substitute drinks, wherein a non-alcoholic drink is a version of an alcoholic drink made without alcohol, or with the alcohol removed or reduced to almost zero. Likewise, a non-alcoholic drink may be made as to comprise components that imitate or resemble the taste of, or the sensation given by, an alcoholic drink. A non-alcoholic drink may also be called a temperance drink, a faux-spirit, an alcohol substitute drink or a non-alcoholic spirit. Likewise, a non-alcoholic drink prepared by removing all or almost all of alcohol from an alcoholic drink may alternatively be labeled or defined as "dealcoholized" or "alcohol-removed" or "alcohol substitute", as this may be required or allowed by local or national regulations, laws or official policies. The invention describes a method for preserving, i.e. increasing the lifetime, a non-alcoholic drink, and also describes a complete product that contains a non-alcoholic drink. Both the method and the complete product aim at extending the shelf-life or lifetime of said non-alcoholic drink, especially when the latter does not contain added artificial preservatives. The shelf-life or lifetime are terms that herein especially refer to the period starting with bottling in a bottle said drink, continuing with opening the bottle and start serving said drink, and finishing with emptying the bottle. As such, the present invention offers a solution to the problem of how to preserve a bottled non-alcoholic drink without using/adding preservatives in the drink, or at least without adding (using) excessive amounts of said preservatives.

BACKGROUND

Non-alcohol drinks resemble, in terms of their organoleptic properties, their alcohol containing counterparts, but they do not contain alcohol, or they contain a minute amount of alcohol that itself is hard to lead to intoxication of a person consuming the drink. For this reason, non-alcohol drinks or alcohol substitute drinks are very popular among consumers who, generally, are positively disposed towards consuming a drink that resembles an alcoholic one, but wish to avoid experiencing themselves any of the adverse effects produced by the consumption of even small or significant amounts of alcohol. There are also some consumers who for health reasons, or for religious/cultural reasons, refrain from alcohol, yet they would like to experience/mimic the alcohol drinking occasion.

Overall, said consumers want something different, memorable, and refined whatever they are drinking. Likewise, said consumers wish special consideration to be held for the preparation, the pouring, and the serving that should provide a theatrical experience, and make it easy for people to enjoy non-alcohol drinks while not feeling isolated or minority inside a venue when other people are enjoying alcohol drinks. This consideration is reflected in how in the last few years non-alcohol drinks are displayed on menus, often alongside aperitifs, accompanying food and wine, while being recognized and categorized in their own distinctive class. Their price points also tend to be much closer to alcoholic drinks than standard soft drinks. Challenging and complex flavors, interesting ingredients, natural production, and unusual combinations, but served in familiar ways, are only few of the factors that constitute this class of non-alcoholic drinks.

The known production of these non-alcohol drinks mainly comprises adding in a drink chemical flavors that mimic the alcohol taste/feel, and/or using de-alcoholization methods, e.g. vacuum distillation, reverse osmosis etc, on spirits, wine, or fermented juice raw materials. In these cases, the quantity of alcohol which has been removed, was holding in the drink the role of preservative, ensuring the stability, the long shelf-life, the conservation of the organoleptic properties (e.g. the taste) of the drink, and the inhibition of the growth of any microorganisms, yeasts or molds. Overall, in an alcoholic drink the alcohol preserves the quality of the drink. Therefore, in non-alcoholic drinks there is the problem of how to preserve the drink and all the important properties of the same, which would be otherwise preserved by the alcohol if the drink had indeed alcohol. This problem is particularly significant and challenging to solve because a non-alcohol drink, such as for example a non-alcohol whiskey, usually contains any of sugars, invert sugars, natural extracts, fermented juices (e.g. grape juice), natural flavors, caramel, natural colorings etc, many of which provide an excellent source of nutritional requirements for microorganisms to grow. In particular, fermented ingredients such as fermented grape juice (used in wine-based products or non-alcoholic wine), or vinegar (used in shrubs), or wheat barley and maize (used in non-alcoholic whiskey), combined with natural sugars, contribute to forming an ideal environment for yeasts/molds/mycotoxins and other microorganisms to grow. Other parameters, such having a non-alcoholic drink of a pH>3.5, and/or storing the drink without closely controlling the storage temperature, increase the risks of microbial growth in the drink. Most crucially, the aforementioned problem of how to preserve the non-alcoholic drink, is amplified by the following condition: a bottle/container that contains a non-alcoholic drink/spirit is usually opened 25-40 times (15-30 ml average serving in a cocktail, for a 700 ml bottle), and usually once opened can remain for weeks or months in a bar or restaurant display, or in a domestic cabinet for liquors. Likewise, a bartender can keep the bottle open in a difficult and not clean environment like a bar/club etc, and of course, a single bottle can be opened and used by multiple professionals, until fully served/consumed. This is a unique condition that is encountered in the technical field of faux spirits and thusly, differentiates crucially said technical field from other fields such the ones of other packaged/bottled drinkable liquids that are meant to be consumed within very few days (e.g. 1-3 days) and via a single serving or via a handful of servings.

To address the aforementioned problems, in the prior-art that comprises the commercially available non-alcoholic drink products the proposed solution is the use of added preservatives in the drink. The added preservatives promote the stability and shelf-life of the product, before first opening, while contribute to the prevention of microbial growth once the bottle is opened. Of course, contrary to the spirits practices, the non-alcoholic spirits are classified as food, and therefore as per the usual legislation there is a label on the bottle that among other information displays to the consumer the added preservatives contained in the non-alcoholic drink. This can make the product unattractive to several consumers which for example may be concerned by what is the preservatives consumption's long term impact on the human health. Moreover, due to the conditions described above, even for a non-alcoholic drink of a formulation that comprises preservatives (almost all similar existing products have preservatives) there is a very high probability that said drink under the challenging environments and temperatures it will undergo during its shelf-life, will develop microorganisms, especially once the preservative is fully consumed.

In addition to that, a further advantage of having a preservative free non-alcoholic spirit formulation, is that the latter most probably has a more authentic and better taste, since the preservatives tend to alter the flavor of a beverage, and/or to mask some desired but subtle flavors. Some preservatives have a characteristic odor/taste which can be a drawback in the effort to achieve a drink with the desired organoleptic properties. Even when a non-alcoholic drink has some added natural preservatives which are not required to be labeled or indicated as such on the nutritional label accompanying the drink in the market, said preservatives usually do not work very well for preserving the drink over long periods of time on multiple bottle opening.

Therefore, in the technical field of non-alcoholic drink products there is the technical problem of how in a non-alcoholic drink product that is attractive to the consumers, to preserve the non-alcoholic drink contained thereat while avoiding using added and/or artificial preservatives, or at least keeping the amount of added preservatives used at the minimum possible level. The present invention solves this problem.

SUMMARY

To that end, the present invention in its first aspect provides a product that comprises
- a bottle that has a mouth;
- a drink inside said bottle, the drink comprising a version of an alcoholic drink, wherein in said version there is no alcohol or there is alcohol at a concentration by volume of equal to or less than a maximum concentration by volume of less than 1.5%;
- a pourer, wherein said pourer comprises a solid main body that is attached to said mouth, a flow channel at said main body, a check valve at said flow channel, and an air-vent channel at said main body, a filter at said air-vent channel, wherein the flow channel and the check valve are configured for allowing via the same a flow of the drink from inside the bottle towards outside the product, the air-vent channel is configured for allowing air from outside the product to pass inside the bottle via said air-vent channel during said flow of the drink, and the filter is configured for producing a filtration of said air when the latter passes from outside the product to inside the bottle via said air-vent channel, the drink being any of a non-alcoholic drink, an alcohol substitute drink, a low alcohol drink, an alcohol free drink, a de-alcoholized drink. Optionally and preferably said filtration is a sterile filtration. The check valve may be or be substituted by non-return means for allowing the flow of the liquid only in one direction, and blocking or inhibiting the flow in the opposite direction.

Below, the term non-alcoholic drink is used to describe also any of an alcohol substitute drink, a low alcohol drink, an alcohol free drink, a de-alcoholized drink.

All of the aforementioned elements of the first aspect of the invention are important for solving the technical problem of providing a non-alcoholic drink product that is attractive to the consumers, and wherein the alcoholic drink is preserved, thusly having a relatively long lifetime and shelf life after first opening and throughout multiple servings, even when said drink contains small amounts of added preservatives or when it does not contain any added preservatives.

The bottle is the standard type of container that is commonly used for containing non-alcoholic drinks, because the latter, as indicated earlier, for being attractive to the consumer must be presented in a way that resembles the way alcoholic drinks are presented. Therefore, most preferably the bottle has one or more of the features of any of the bottles used for bottling alcoholic spirits/drinks. Consequently, optionally and preferably the bottle is a glass bottle or more generally comprises glass. Likewise, optionally the size of the bottle, meaning the ideal maximum volume of the drink that the bottle is configured to contain, is one of the sizes that are commonly dictated by any of the legal regulations existing in most, if not all, countries for regulating the alcoholic drink products. Therefore, optionally and preferably the bottle has a bottle of size of any of 50 ml, 100 ml, 200 ml, 350 ml, 375 ml, 500 ml, 700 ml, 750 ml, 1000 ml, 1500 ml, 1750 ml, 2000 ml, 3000 ml. The aforementioned bottle sizes may vary by ±5%, or by 2% to account for corresponding margins described in some of said legal regulations.

As described further above, the non-alcoholic drink should not contain alcohol, or should contain a minute concentration of alcohol that permits said drink to be categorized and labeled as a non-alcoholic one (or its equivalents) per the various countries' national regulations, and inhibits alcohol induced intoxication of a consumer drinking said non-alcoholic drink. Consequently, the concentration by volume of the alcohol in said drink should be zero, or should be below 1.5%. The maximum concentration, meaning the maximum concentration by volume, that the drink may have, may be subject to the exact regulation in each country where the product is to be used. Taking into account most common corresponding regulations, it is contemplated that for abiding to said regulations, and thus for making the product attractive to the consumer, in said product optionally the maximum concentration by volume is any of 1.2%, 0.5%, 0.05%.

The exact labeling of a non-alcoholic drink may be dictated by laws, regulations or official policies at the national or international level. For example, a non-alcoholic drink prepared by de-alcoholization of an alcoholic drink, may be labeled as a "dealcoholized" or "alcohol-removed". Likewise, in a country a non-alcoholic drink may be allowed to be named or advertised or sold or marketed as an "alcohol substitute drink" or as any of the aforementioned names/definitions that are alternatively used for calling the non-alcoholic drink. An alcohol substitute drink can be easily perceived by the consumer as a drink that despite its non-existent or very low alcohol content, its properties, particularly its taste, resemble the taste of an alcoholic drink. A non-alc drink may in a country be allowed to be labeled as "low alcohol" if it contains less than 1.2% alcohol by volume. Likewise, in a country the non-alc drink may be allowed to be labeled as "alcohol free" if it contains no more than 0.5% alcohol by volume. In a country a drink from which alcohol was extracted may be allowed to be labeled as "de-alcoholized" if it contains no more than 0.5% alcohol by volume. For example, in the United Kingdom the terms "low alcohol", "non-alcoholic", "alcohol free", "de-alcoholized", "alcohol substitute" are used for describing drinks which although contain low or zero alcohol content, due to their taste and/or way of being marketed or produced they can be commonly associated with alcoholic drinks [ref. 1].

As described further above, most preferably the non-alcoholic drink has all or most of the organoleptic properties of its alcoholic equivalent, but crucially the non-alcoholic drink does not have alcohol or a has minute concentration (<1.5% by volume) of alcohol. Said non-alcoholic drink can optionally be a non-alcoholic version of a single common alcoholic drink, or can be mixture or cocktail that comprises one or more non-alcoholic versions of corresponding common alcoholic drinks. By the term common alcoholic drink it is meant herein an alcoholic drink that is known by many consumers. Therefore, regarding the product according to the first aspect of the invention, the (common) alcoholic drink (of which the non-alcoholic drink is an alcohol-free or reduced-alcohol version as described above) optionally is or comprises any of a gin, a whiskey, a rum, a tequila, a vermouth, a beer, a liqueur, an absinthe, an aquavit, a brandy, a cachaça, a calvados, a cider, a cognac, a jenever, a grappa, a mead, a mezcal, a port, a sherry, a vodka, a wine, a whisky, a bourbon. Likewise, from the above it is obvious that in the product according to the first aspect of the invention optionally and preferably the non-alcoholic drink is or comprises any of a non-alcoholic gin, a non-alcoholic whiskey, a non-alcoholic rum, a non-alcoholic tequila, a non-alcoholic vermouth, a non-alcoholic beer, a non-alcoholic liqueur, a non-alcoholic absinthe, a non-alcoholic aquavit, a non-alcoholic brandy, a non-alcoholic cachaça, a non-alcoholic calvados, a non-alcoholic cider, a non-alcoholic cognac, a non-alcoholic jenever, a non-alcoholic grappa, a non-alcoholic mead, a non-alcoholic mezcal, a non-alcoholic port, a non-alcoholic sherry, a non-alcoholic vodka, a non-alcoholic wine, a non-alcoholic whisky, a non-alcoholic bourbon, wherein non-alcoholic signifies (means) that the non-alcoholic drink does not have alcohol or has alcohol at a concentration by volume that is equal or less than the maximum concentration by volume. Optionally and preferably the non-alcoholic drink does not comprise milk. Likewise, as mentioned above the non-alcoholic drink optionally comprises a temperance cocktail that may further optionally comprise a soft drink or a fruit juice or any natural or artificial flavors and aromas. A non-limiting list of examples of temperance cocktails are: gin-tonic, mohito, daquiri, caipirinhia, spritz, cosmopolitan, margherita, in which there is no alcohol or there is alcohol at a concentration by volume of equal to or less than a maximum concentration by volume of less than 1.5%.

Obviously, the non-alcoholic drink has ingredients that makes it resemble the taste and/or color and/or aroma and/or any of other organoleptic properties of its corresponding alcoholic drink. In one non-binding example, a non-alcoholic drink in the product comprises aldonic acids, and especially gluconic acid & sodium gluconate which are an ideal choice as potent taste improvers, to mimic the "mouthfeel" of alcohol, and have a slightly sweet, mild acid taste with a persistent effect on the tongue and harmonizes very well with other flavors. In a second non-binding example, the non-alcoholic drink in the product comprises acetic acid that is used to create the mouthfeel of alcohol, particularly when used in combination with specific flavors and/or extracts and/or correct stabilizers and/or acidity regulators towards the same purpose. Likewise, in a third non-binding example, the non-alcoholic spirit of the product contains extracts, artificial or natural flavors, herbs and spices found in their alcoholic counterparts. In a further non-binding example, the non-alcoholic drink of the product contains maltol that is used as a flavor enhancer to improve the "alcohol effect" on the tongue, imparting a sweet aroma, achieving the thick, rounded consistency and "burn" that alcohol delivers. In yet another example, a product according to the first aspect of the invention comprises a non-alcoholic rum that comprises a phenol, a lacton, an acetal, a 3,8,8, trimethyl hydronapthalene isomer, a furfural, isoamyl acetate, ethyl octanoate, ethyl decanoate, which contribute to a characteristic rum flavor and other properties. In another non-binding example, the non-alcoholic drink comprises a non-alcoholic vermouth that comprises an artemisia flavor, an artemisia extract and a wormwood extract each of which contributes to the characteristic vermouth flavor. In another non-binding example, the non-alcoholic drink comprises a non-alcoholic gin that comprises a juniper extract, a juniper macerate, or a juniper flavor, each of which contributes to the characteristic gin flavor. In another non-binding example, the product comprises a non-alcoholic whiskey that comprises n-propanol, isobutanol, acetic acid, active amyl alcohol and isoamyl alcohol, which contribute to the whiskey flavor. Considering the non-binding examples mentioned above, optionally and preferably in the product according to the first aspect of the invention the non-alcoholic drink comprises any of n-propanol, isobutanol, acetic acid, active amyl alcohol, isoamyl alcohol, a juniper extract, a juniper macerate, a juniper flavor, an artemisia flavor, an artemisia extract, a wormwood extract, a phenol, a lactone, an acetal, a 3,8,8, trimethyl hydronapthalene isomer, furfural, isoamyl acetate, ethyl octanoate, ethyl decanoate, an aldonic acid, gluconic acid, sodium gluconate, maltol.

Another important feature of the product is the pourer. The pourer can also be considered as being a cap that is attached to the mouth or the neck of the bottle. As is common general knowledge the bottle has a (hollow) neck that has a length, and the mouth is an upper part of said neck, and a liquid can be poured into the interior of the bottle via said mouth and via said neck. Therefore, in a product according to the invention, the location of the pourer, and more specifically the location of the main body of the pourer at the bottle may alternatively be defined as follows: the pourer, or the main body of said pourer, is attached to the neck of the bottle. Therefore, the pourer, or the main body of it, may not necessarily be at the upper end/part of the neck, but may actually be at any point across the length of the neck. However, the pourer preferably is at the upper part of the neck, where the mouth is.

As is general common knowledge a pourer is a component that is configured to be attached to the bottle so that normally, e.g. under normal conditions, a drink within said bottle cannot exit the bottle without passing via the pourer. Accordingly, it is obvious to the skilled person that in the present invention the pourer or its main body is configured, and for example said main body is adapted, to fit at the mouth and/or at the neck of the bottle so that a liquid (the drink) within the bottle cannot leak and exit the bottle without passing via the pourer, and most preferably without passing via the flow channel of the pourer. Therefore, the pourer may also be refereed to using any of the following terms which are often used in the technical field to describe pourers which serve additional functionalities such as offering simple sealing of the bottle when not serving the drink, and/or preventing/inhibiting pilfering or adulteration: cap, anti-tampering closure, pilfer proof cap. Considering that usually (but not always) bottles have cylindrical necks and mouths, in the context of the present invention optionally and preferably the main body is cylindrical so it is attached to the mouth and/or within the neck of the bottle. Optionally and preferably the pourer is fitted within said neck or mouth, and more specifically at the upper part of said neck wherein the mouth of the bottle is located. Likewise, optionally and preferably the pourer is a snap-on pourer, meaning that that when assembling/fabricating the product, and more specifically when attaching to said mouth the main body of the pourer, said attaching comprises securing the pourer (its main body) in the (hollow) neck onto the bottle by means of vertical pressure. Optionally and preferably, said pourer is permanently attached on the bottle, which means that once the pourer is fixed on the bottle it cannot be removed unless when breaking the bottle. Optionally said pourer is detachable from the mouth and/or neck of the bottle. Likewise, optionally the pourer is a roll-on pourer, meaning that said attaching comprises securing the pourer and its main body onto the bottle by means of rollers that bend a component of the pourer under a bead of the bottle. Likewise, optionally the pourer is a screw-on pourer, meaning that said attaching comprises securing the pourer (its main body) onto the bottle by means of screwing.

For being sterilizable and chemically resistive to the non-alcoholic drink, the pourer, and any parts of it, and in particular the main body and/or the check valve, and/or any parts of said check valve are optionally made off or comprise any of glass, stainless steel, aluminum, high density polyethylene (HDPE), polypropylene (PP), polyethylene (PE), low density polyethylene (LDPE), and mixes thereof, e.g. 50% HDPE and 50% PP. Optionally said check valve is a check ball valve. Likewise, optionally when said check valve is a check ball valve, the ball(s) is made off or comprises any of the aforementioned in this paragraph materials. Likewise, a check ball valve may optionally comprise a plurality of check balls and/or a plurality of compartments or chambers.

As is obvious to the skilled person the flow channel and the air-vent channel extent across a thickness of pourer or of the main body of the pourer, and most preferably from a first surface of the pourer, wherein said first surface faces the non-alcoholic drink (or the interior of the bottle) in the bottle, to a second surface of the pourer, wherein said second is located opposite to said first surface and faces towards outside the bottle. Consequently, preferably the flow channel starts from a first flow opening (a first opening for liquid flow) at said first surface, and ends at second flow opening at said second surface. Likewise, preferably the air-vent channel starts from a first air-vent opening at said first surface, and ends at a second air-vent opening at said second surface. It is contemplated that for achieving a smooth flow of the liquid during pouring of the latter, then a cross section of the air-vent channel should preferably be larger in diameter (if cross sections are round) or in surface area than a cross section of the flow channel, because that would allow to achieve good air-vent, i.e. good/adequate flow of air from outside the bottle to inside the bottle via the air-vent channel during the pouring the drink. Said cross section of the flow channel optionally is any of said first flow opening and second flow opening. Likewise, said cross section of the air-vent channel optionally is any of said first air-vent opening and said second air-vent opening. Considering the above, it is contemplated that optionally and preferably in the product according to the first aspect of the invention the flow channel has a first cross section of a first area, and the air-vent channel has a second cross section of a second area that is larger than the first area.

The check valve may be (located) at any point across the length of flow channel. The check valve is a very important element of the product and invention, because it is (or can be) configured to allows the outflow/pouring of the drink from the bottle, while by definition it prevents or inhibits the reverse flow. Therefore, the check valve by definition is (or can be) configured for inhibiting a reverse flow via the same of the non-alcoholic drink, wherein said reverse flow is opposite in direction to said flow. The inventors contemplate that the effect of the check valve in solving the problem of how to preserve the drink in the bottle is very important, because the check valve by inhibiting the reverse flow and thus by inhibiting any drink droplets that have passed said check valve or pourer from going back inside the bottle when the serving stops, it essentially prevents the contamination of the drink in said bottle from said droplets. In the absence of said check valve said droplets flowing back into the bottle via the flow channel could contaminate the drink because outside the interior of the bottle they could have picked up dirt and/or contaminants.

Optionally and preferably the check valve has a movable member that is configured to move between an open position and a close position, and the flow channel and the valve are configured for allowing via the same a flow of the non-alcoholic drink from inside the bottle towards outside the product when the movable member is at the open position, and are also configured for inhibiting a reverse flow via the same of the non-alcoholic drink when the movable member is at the close position, said reverse flow being opposite in direction to said flow. In the optional case that the check valve is a check ball valve, said movable member is a ball, and optionally, its close position is where the ball closes/blocks the flow channel and its open position is where the ball does not close nor blocks the flow channel. Optionally, the flow channel comprises the check valve.

Optionally the flow channel is at, or passes via, the center of the pourer, or closely by said center. Likewise, optionally the air-vent channel is at, or passes via, the center of the pourer, or closely by said center.

Most preferably the filter is considered as being part of the air-vent channel because according to the first aspect of the invention when air is vented via said air-vent channel, it is filtered, and thus passes via, said filter. Since the filter is configured for producing a filtration, and preferably a sterile filtration, of said air, optionally and preferably said filter is a membrane filter, or is a filter that comprises membranes, because membrane filters can yield sterile filtration of very high quality, and at a relatively low cost membrane filters can be made to be compact, small in size and robust. Likewise, said filter optionally and preferably is hydrophobic, to prevent liquid from staying on or passing via the filter, and to prevent the growth of mold or other contaminants on said filter.

Optionally the filter is made off or comprises any of a polytetrafluoroethylene (PTFE) membrane, a polyvinylidene fluoride (PVDF) membrane, a polypropylene (PP) membrane, a polyethersulfone (PES) membrane. Each of these membrane materials yield a very high quality sterile filtration when used in the product, as is demonstrated by experimental results presented further below.

One of the functionalities of the filter is to remove, at least some of, the biological or other contaminants, such as particulates, from the air that passes via the air-vent channel. Therefore, optionally the filter is porous so that said contaminants cannot pass via the porous structure of the filter. Optionally the pore size, or an average pore size, is smaller in size than the size of said biological or other contaminants that are to be blocked from the filter. May of said contaminants that are to be blocked have a size of few tenths or few hundreds of nanometers. Therefore, optionally and preferably the filter is porous with a pore size of between 0.01 μm and 1 μm, and preferably of about 1 μm, and more preferably of about 0.45 μm, and most preferably of about 0.2 μm or of about 0.22 μm. Optionally, the filter or at least a part of said filter is part of the air channel, i.e. the air-vent channel comprises the filter. The filter optionally is (located) within the main body and at any point across the air-vent channel, or is located at one of two extremes sites of said air-vent channel. Therefore, optionally said filter is located at, and/or is attached to, any of said first air-vent opening and second air-vent opening.

The combined effect of the air-vent valve and filter is that contaminants being outside the bottle/product are prevented from entering the bottle. Consequently, the non-alcoholic drink content and environment inside the bottle is protected from external contamination, even after start serving the non-alcoholic drink.

The invention in its second aspect provides a method for extending the lifetime of a drink, the drink comprising a version of an alcoholic drink, wherein in said version there is no alcohol or there is alcohol at a concentration by volume of equal to or less than a maximum concentration of less than 1.5%, the method comprising:

placing the drink inside a bottle that has a mouth;
attaching to said mouth a main body of a pourer, wherein said pourer comprises a flow channel at said main body, a check valve at said flow channel, an air-vent channel at said main body, wherein
the flow channel and the check valve are configured for allowing via the same a flow of the drink from inside the bottle towards outside the product, the air-vent channel is configured for allowing air from outside the product to pass inside the bottle via said air-vent channel during said flow of the drink, and the filter is configured for producing a filtration of said air when the latter passes from outside the product to inside the bottle via said air-vent channel, the drink being any of a non-alcoholic drink, an alcohol substitute drink, a low alcohol drink, an alcohol free drink, a de-alcoholized drink. Likewise, said filtration is preferably a sterile filtration.

The method according to the second aspect of the invention, can also be considered as a method for avoiding using/having (added) preservatives in the non-alcoholic drink, or avoiding using/having an excessive amount of (added) preservatives is said drink. Likewise, it is noted that optionally the mouth of the bottle is or comprises the (hollow) neck of the bottle or vice versa.

Essentially, any of the bottle, the pourer and the non-alcoholic drink, and any components thereat may have any of the optional or essential features described above in relation to the first aspect of the invention.

Preferably the non-alcoholic drink (e.g. a bulk solution or quantity of said non-alcoholic drink) should not have been contaminated before being placed in the bottle and before the pourer is attached to the mouth or neck of the bottle. Therefore, timewise the preparation of the non-alcoholic drink should be as close as possible to the aforementioned steps of placing the non-alcoholic drink in the bottle and attaching the pourer's main body to said bottle's mouth or neck. Therefore, optionally and preferably, in the method according to the first aspect of the invention prior to placing the non-alcoholic drink inside the bottle the method further comprises preparing the non-alcoholic drink, and preparing comprises any of the following and combinations thereof:

macerating fruits and/or fruit components together with herbs and/or spices;
removing the alcohol from an alcoholic drink, or reducing the alcohol concentration by volume of said alcoholic drink to below the maximum concentration, by processing said alcoholic drink using a reverse osmosis process and/or a distillation process;
adding a preservative to the non-alcoholic drink.

The skilled person can understand that the teachings of the present invention are also applicable in the optional case the non-alcoholic drink does contain some preservatives. Therefore, optionally said non-alcoholic drink comprises any of dimethyldicarbonate (DMDC), benzoic acid (E210), sodium benzoate (E211), potassium benzoate (E212), calcium benzoate (E213), sorbic acid (E200), potassium sorbate (E202) and calcium sorbate (E203).

For avoiding the contamination of the drink during placing the non-alcoholic drink inside the bottle, said placing the non-alcoholic drink inside the bottle, which can also be optionally referred to as filling, optionally comprises any of:

hot-filling that comprises heating up the non-alcoholic drink to a temperature of up to 91° C.;
aseptic processing;
aseptic filtration;
doing tunnel pasteurization.

At 91° C. most, if not all, of any potential biological contaminants are destroyed or neutralized.

The term aseptic processing describes executing the aseptic fill technique. The aseptic fill is a technique used where the drink is flash pasteurized by heating to 180-220 degrees Celsius for some (or a few) minutes or seconds, and then is cooled and filled/placed in the bottle at room temperature. Most preferably aseptic processing comprises using "clean" or sterilized primary packaging components, and/or comprises executing a pasteurization of the product and/or of any components thereat.

In aseptic filtration, the drink before or during being placed in the bottle is being aseptically filtered by passing through filters (e.g. filtration cartridges) that retain and remove from the passing drink unwanted contaminants and microorganisms.

The term tunnel pasteurization describes a process used in bottle filling. In tunnel pasteurization there are used multiple stages of heating to target temperatures the drink and the bottle or other packaging materials containing said drink, wherein heating is done preferably using steam or hot water. Filled and closed bottles, and therefore the products according to the first aspect of the invention, are held at said target temperatures for a predetermined amount of time to ensure that microorganisms (micros) are killed.

Hot filling is a process where the product is heated up to remove harmful bacteria or microorganisms which might exist or develop in the product. Then the hot fluid is filled into the bottle and the latter is capped. After the filling process, the bottle is immediately cooled, which is an extremely important part in preserving the drink and the latter's taste.

Optionally, placing the non-alcoholic drink inside the bottle comprises a simple traditional bottling processes as used historically in many alcoholic spirits facilities, wherein said traditional bottling does not comprise the use of any special sterility measures, such as a clean room etc, and comprises or relies on adding preservatives in the non-alcoholic drink. Likewise, in a traditional bottling process the drink can be at a room temperature when being placed in the bottle.

From the above, it can be understood, that the method according to the second aspect of the invention, optionally and preferably comprises sterilizing any and preferably all of the bottle, the non-alcoholic drink and the pourer.

Likewise, in the method according to the second aspect of the invention optionally and preferably, the non-alcoholic drink is any of a non-alcoholic gin, a non-alcoholic whiskey, a non-alcoholic rum, a non-alcoholic tequila, a non-alcoholic vermouth, a non-alcoholic beer, a non-alcoholic liqueur, a non-alcoholic absinthe, a non-alcoholic aquavit, a non-alcoholic brandy, a non-alcoholic cachaça, a non-alcoholic calvados, a non-alcoholic cider, a non-alcoholic cognac, a non-alcoholic jenever, a non-alcoholic grappa, a non-alcoholic mead, a non-alcoholic mescal, a non-alcoholic port, a non-alcoholic sherry, a non-alcoholic vodka, a non-alcoholic wine, a non-alcoholic whisky, a non-alcoholic bourbon, and wherein non-alcoholic signifies that the non-alcoholic drink does not have alcohol or has alcohol at a concentration by volume that is equal or less than the maximum concentration by volume.

Likewise, in the method according to the first aspect of the invention optionally and preferably the maximum concentration (by volume) is any of 1.2%, 0.5%, 0.05%.

The invention its third aspect describes a pourer that is the pourer described above in relation to the first and second aspect of the invention. Therefore, a further object of the invention is said pourer. Another aspect of the invention is the use of said pourer in a product that contains a drink such as a non-alcoholic or an alcohol substitute drink as described above. Said use can prolong the product's shelf lifetime after multiple openings/servings.

An additional aspect of the invention is the use of a product according to the first aspect of the invention, in a bar, or restaurant, or hotel or any other commercial establishment, especially for serving and/or displaying the non-alcoholic drink in said product.

Another aspect of the present invention is a product that comprises
a bottle that has a mouth;
a non-alcoholic drink inside said bottle, the non-alcoholic drink comprising a version of an alcoholic drink, wherein in said version there is no alcohol or there is alcohol at a concentration by volume of equal to or less than a maximum concentration by volume of less than 1.5%;
a pourer, wherein said pourer comprises a solid main body that is attached to said mouth, a flow channel at said main body, a check valve at said flow channel, and an air-vent channel at said main body, a filter at said air-vent channel.

BRIEF DESCRIPTION OF THE DRAWINGS

The previous and other advantages and features will be more fully understood from the following detailed description of embodiments, with reference to the attached figures, which must be considered in an illustrative and non-limiting manner, in which:

FIG. 2 shows only some of the features of the product.

DETAILED DESCRIPTION OF THE EMBODIMENTS

Figure 1:
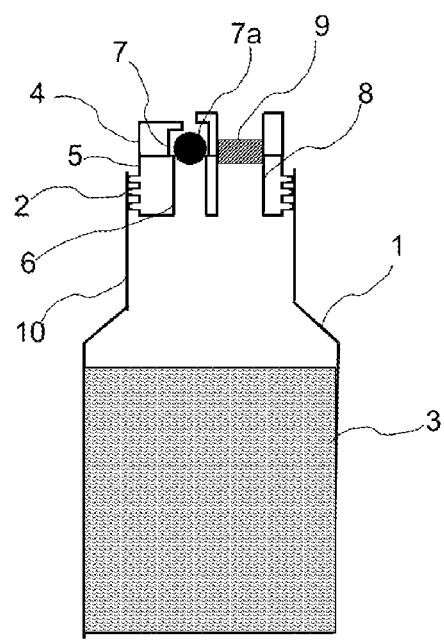
FIG. 1 is a cross section of a preferred embodiment of the product according to the first aspect of the invention, that illustrates the several features of the product.

FIG. 1 shows a cross section of a preferred embodiment of the product according to the first aspect of the invention. The product presented in FIG. 1, comprises
a bottle 1 that has a mouth 2;
a non-alcoholic drink 3 inside said bottle 1, the non-alcoholic drink 3 comprising a version of an alcoholic drink, wherein in said version there is no alcohol or there is alcohol at a concentration by volume of equal to or less than a maximum concentration by volume of less than 1.5%;
a pourer 4, wherein said pourer 4 comprises a solid main body 5 that is attached to said mouth 2, a flow channel 6 at said main body, a check valve 7 at said flow channel 6, and an air-vent channel 8 at said main body, a filter 9 at said air-vent channel 8, wherein
the flow channel 6 and the check valve 7 are configured for allowing via the same a flow of the non-alcoholic drink 3 from inside the bottle 1 towards outside the product, the air-vent channel 8 is configured for allowing air from outside the product to pass inside the bottle 1 via said air-vent channel 8 during said flow of the non-alcoholic drink 3, and the filter 9 is configured for producing a sterile filtration of said air when the latter passes from outside the product to inside the bottle via said air-vent channel 8.

In the embodiment of FIG. 1 the check valve 7 has a movable member 7a that is configured to move between an open position and a close position, and the flow channel 6 and the check valve 7 are configured for allowing via the same a flow of the non-alcoholic drink 3 from inside the bottle towards outside the product when the movable member is at the open position, and are also configured for inhibiting a reverse flow via the same of the non-alcoholic drink 3 when the movable member 7a is at the close position, said reverse flow being opposite in direction to said flow. Likewise, more specifically in the embodiment in FIG. 1 the check valve is a ball check valve and the movable member is a ball. In FIG. 1 the ball is shown to be in between the close position and the open position, wherein in the close position the ball would rest on the part of the channel and main body below said ball towards the drink, blocking thereat the flow channel. Likewise, the ball would be at the open position when it would be further up from said close position. Said ball can move under the action of gravity when the bottle is moved, for example when the user of the product turns up side down the product when or for serving the non-alcoholic drink. In FIG. 1 there is also indicated the neck 10 of the bottle 1. In an embodiment of the product the location of the pourer 4 can be described as follows: the pourer 4 and the main body 5 of it are attached to the neck 10 of the bottle.

Figure 2:
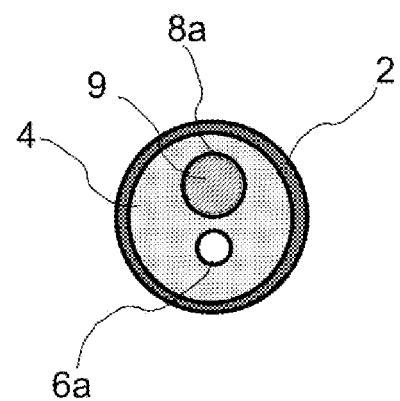
FIG. 2 shows a top-view of embodiment shown in FIG. 1, wherein said

FIG. 2 shows a top view of the product shown in FIG. 1 wherein in FIG. 2 for clarity of presentation there is shown the mouth 2 of the bottle with other parts of the bottle being omitted. Likewise, in FIG. 2 there can be seen the pourer 4, and more particularly a second surface of said pourer, said second surface facing outside the bottle and being opposite to a first surface (not shown) of said pourer, said first surface facing the interior of the bottle and the drink thereat. In FIG. 2 said second surface is highlighted by the thin-dot pattern drawn thereat. On said second surface there are two openings each of which respectively acts as a respective end/extreme part of the flow channel and the air-vent channel. The opening related to the flow channel can be considered as being a second flow opening of said air vent channel. The opening related to the air-vent channel can be considered as being a second air-vent opening of the air-vent channel. Likewise, each of said openings can be considered as being a cross section of the respective channel. Therefore, as indicated in FIG. 2 the flow channel has a first cross section (6a) of a first area, and the air-vent channel has a second cross section (8a) of a second area that is larger than the first area. Within said second cross section (8a) of the air-vent channel, this is to say within the air-vent channel, there is the filter (9). The filter in this particular embodiment is a hydrophobic membrane filter configured for producing a sterile filtration.

The embodiment of the product according to the first aspect of the invention, said embodiment shown in FIG. 1, can also be described as follows:
the product comprises:
 a bottle that has a mouth;
 a non-alcoholic drink inside said bottle, the non-alcoholic drink comprising a version of an alcoholic drink, wherein in said version there is no alcohol or there is alcohol at a concentration by volume of equal to or less than a maximum concentration of less than 1.5%;
 a pourer, wherein said pourer comprises a solid main body that is attached to said mouth, a flow channel at said main body, a check valve at said flow channel, and an air-vent channel at said main body, wherein
 the check valve has a movable member that is configured to move between an open position and a close position, and the flow channel and the valve are configured for allowing via the same a flow of the non-alcoholic drink from inside the bottle towards outside the product when the movable member is at the open position, and are also configured for inhibiting a reverse flow via the same of the non-alcoholic drink when the movable member is at the close position, said reverse flow being opposite in direction to said flow, and the air-vent channel comprises a hydrophobic filter and is configured so that, when pouring the non-alcoholic drink, air from outside the product passes inside the bottle via the air vent channel and the hydrophobic filter thereat.

According to a preferred embodiment of a method for extending the lifetime of a non-alcoholic drink according to the second aspect of the invention, the non-alcoholic drink comprising a version of an alcoholic drink, wherein in said version there is no alcohol or there is alcohol at a concentration by volume of equal to or less than a maximum concentration by volume of less than 1.5%, the method comprises:
 placing the non-alcoholic drink inside a bottle that has a mouth;
 attaching to said mouth a main body of a pourer, wherein said pourer comprises a flow channel at said main body, a check valve at said flow channel, an air-vent channel at said main body, wherein
 the flow channel and the check valve are configured for allowing via the same a flow of the non-alcoholic drink from inside the bottle towards outside the product, the air-vent channel is configured for allowing air from outside the product to pass inside the bottle via said air-vent channel during said flow of the non-alcoholic drink, and the filter is configured for producing a sterile filtration of said air when the latter passes from outside the product to inside the bottle via said air-vent channel.

Figure 3:
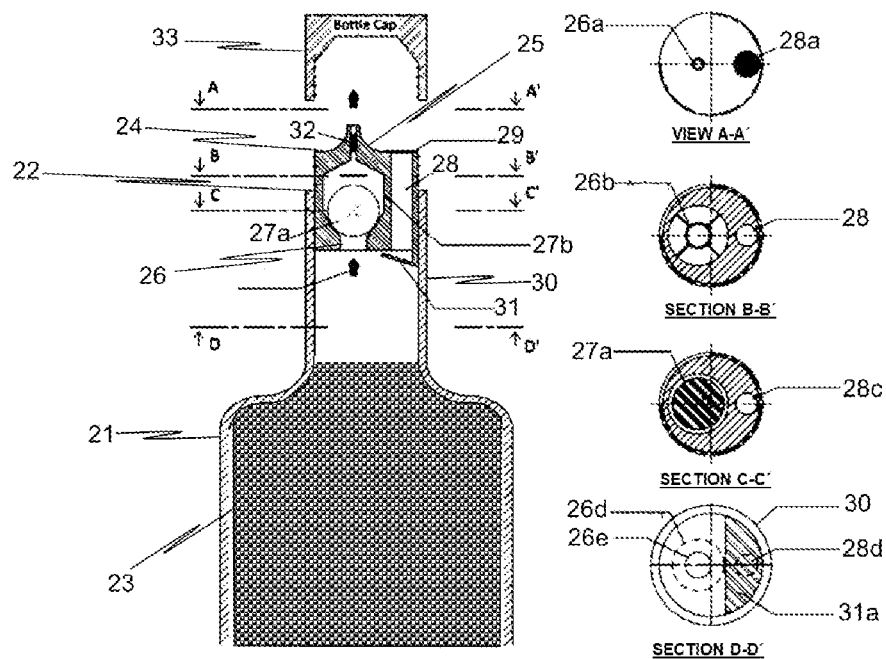
FIG. 3 shows cross sections of another preferred embodiment of a product according to the first aspect of the invention.

FIG. 3 shows cross sections of a preferred embodiment of a product according to the present invention. The product shown in FIG. 3 comprises a bottle 21 containing the non-alcoholic drink 23, the bottle having a neck 30 and a mouth 22. Attached to said mouth and inserted, partially, in the neck is a pourer 24 that has a main body 25. The main body comprises a flow channel 26 and an air-flow, i.e. air vent, channel 28. Attached to a top end of the air-vent channel 28 there is filter 29. The filter in this particular case is outside the bottle, although it could be also inside i.e. in another position at the air vent channel. The geometrical projection 28a of said filter on a plane A-A' that is substantially normal to the longitudinal axis of the bottle, is also shown in FIG. 3. Likewise, FIG. 3 also shows the geometrical projection 26a of the upper end of the flow channel, on said A-A' plane. Proximal to the other end of the air-vent channel, within the bottle, the pourer has a protection flap 31 that extends radially inward with respect to the neck's inner side, and towards the inside (interior) of the bottle. The protection flap is an optional feature than can help protecting the air-vent channel from the liquid inside the bottle until air influx towards inside the bottle via the air-vent channel starts, so that the air vent channel does not easily get contaminated or blocked or damaged. The geometrical projection 31a of the protection flap 31 on a plane D-D' that is substantially normal to the longitudinal axis of the bottle, is larger than, and covers the respective geometrical projection 28d of the lower end/extreme of the air vent channel 28, said lower end/extreme being inside the bottle 21 and the bottle's neck 30, as seen in cross section view D-D' that is included in FIG. 3. In FIG. 3 there are also shown the geometrical projections 26d and 26e of respectively the ball 27a and ring 26b, said projections being on said D-D' plain. In this particular case the shape of the air-vent channel is substantially cylindrical having a circular cross sectional profile 28b, 28c as seen in cross section views B-B' and C-C' in FIG. 3. The pourer 24 has a ball backflow controller 27a within a main chamber 27b. The latter is part of the flow channel 26. Within the main chamber 27b and supported by the walls of said main chamber there is a ball holding ring 26b that is shown in the cross section B-B' (the walls of the bottle are not shown in B-B'). The ball holding ring 26b restricts the movement of the ball 27a; it is an optional feature that helps to prevent the blockage, by the ball, of the part of the flow channel that is above the ring in FIG. 3, to further ensure the good outflow of the drink via the flow channel during serving. In the particular embodiment, when the bottle is in a substantially upright position as is shown in FIG. 3, the ball 27a blocks the flow channel at the lower end of the main chamber, and thus prevents or inhibits the backflow of liquid from above the ball and towards the inside of the bottle. In this particular case the ball and the ball holding ring and the chamber have an antimicrobial coating. The flow channel may optionally also have a liquid retaining mesh. Said mesh may retain/hold a bit of liquid even when the bottle is in the upright condition, e.g. when the bottle stands on the shelf, so that liquid retained by the mesh blocks or inhibits the passage of air through flow channel. This may further extend the lifetime of the non-alcoholic drink. The embodiment shown in FIG. 3 does have a liquid retaining mesh 32. Generally, the pourer, and preferably any parts thereat, such as the ball and/or the liquid retaining mesh are made of or comprise an antimicrobial material, or comprise an antimicrobial coating to prevent/inhibit the growth of microbes, because the growth of microbes may damage the drink or even render the product dangerous. Likewise, the filter is preferably an antibacterial filter, and this is the case for the filter 29 of the embodiment of FIG. 3. In FIG. 3 there is also shown cap 33 which is an optional, yet preferred, feature of the product. The pourer at its top surface that faces outside the bottle, or at a part of said surface, may optionally have a pyramidal or conical shape, e.g. have the shape of a truncated cone or pyramid, to further inhibit liquid accumulation at the top of the pourer, or backflow of said liquid via the flow channel. Two thick arrows in FIG. 3 show the general direction of the liquid outflow via the flow channel, with respect to the bottle, during serving. Backflow has a substantially opposite direction with respect to outflow. The presence of the filter does not prevent the outflow nor reduces in an undesirable or problematic way the outflow rate of the drink during serving. Experiments made by the inventors have confirmed that the presence of the filter in the product does not prevent the good and efficient serving of the drink. Likewise, the product works exceptionally well for prolonging the lifetime of the drink after the first drink serving occurs.

In other embodiments that also include an optional protection flap similar to the one mentioned above, the geometrical projection of the protection flap on a plane that is substantially normal to the longitudinal axis of the bottle, is smaller than or equal to, the geometrical projection of the lower end/extreme of the air vent channel on said plane.

Figure 4:
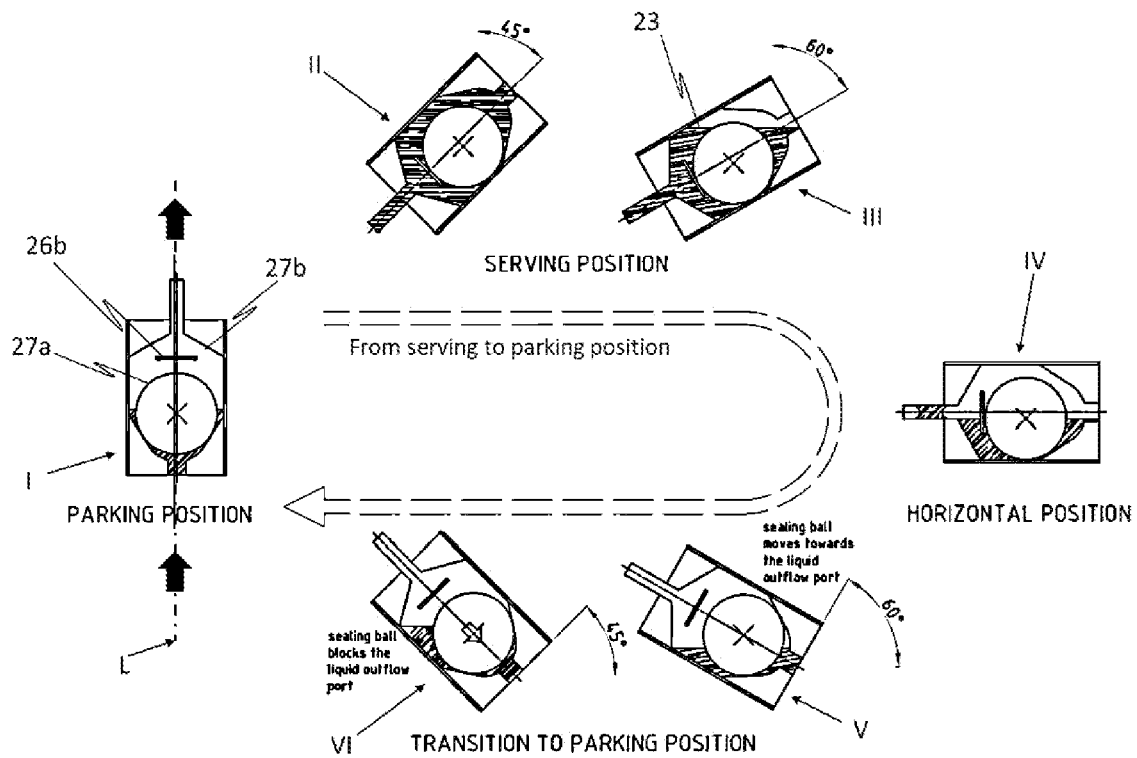
FIG. 4 shows cross sections of a non-limiting example of a check valve at different positions of an embodiment of a product according to the first aspect of the invention, wherein said positions are positions at storing, i.e. parking, the product on the shelf, and positions during serving the product's drink.

FIG. 4 shows different cross sections of an embodiment of a pourer according to the present invention, the different cross sections referring to different positions of the pourer in an embodiment of a product having said pourer, said positions being from parking to serving and back to parking said product. Referring to FIG. 4, in position I that is the parking position, the pourer's longitudinal axis L which coincides with the longitudinal axis of the product's bottle is vertical (normal to the ground) because said bottle is in the upright position e.g. by being standing on a shelf. In FIG. 4 the thick arrows show the direction from inside towards outside the bottle via the flow channel. In FIG. 4 the pourer has non return means, particularly a check valve, located at the flow channel and comprising a main chamber 27b, with a check ball 27a and a stop ring 26b. The main chamber has a lower entrance from which the drink 23 enters the main chamber 27b during serving, and an upper exit from which said drink exits the main chamber, said drink flowing towards outside the bottle and the main chamber during pouring/serving. The pourer is configured so that at upright position I the ball blocks said lower entrance. For serving, the bottle (not shown in FIG. 4) with the pourer may be turned upside down and tilted at different angles, e.g. 45° or 60°, as shown in the serving positions II and III in FIG. 4. As a result of said serving the drink flows through the chamber and fills partly or fully the latter, and the ball is moving, the ball's movement being restricted by the walls of the chamber 27b and the ring 26b, so that the ball does not block said upper exit, and does not block serving. During serving, said drink may block either of, or simultaneously both, said lower entrance (liquid outflow port) and upper exit, as shown in FIG. 4.

Likewise, in the horizontal position IV in FIG. 4 the drink, particularly due to capillary forces, may also block one or both of the chamber's entrance and exit. When after serving the pourer and the bottle are progressively, e.g. via the positions V and VI shown in FIG. 4, returned to the upright/parking position, the ball 27a (also called sealing ball) and any fluid remaining in the chamber progressively return to blocking the chamber's lower entrance so that there is inhibited the flow of air from outside the bottle towards inside of it via the flow channel. Therefore, according to the invention, advantageously a pourer, as for example the one shown in FIG. 4, is preferably configured so that the non-return means, e.g. the check valve, inhibit the flow of air via the flow channel during both serving and parking (positions) of the product/pourer.

The inventors performed an experimental study that demonstrates that the product offer a remarkable solution to the problems described further above.

A particular purpose of said study was to demonstrate with experimental data the protection against key microorganisms namely yeast & molds that the product, and in particular the filter in combination with the check valve in the product, offers when specifically applied on the serving of non-alcoholic drinks for a period covering from first bottle opening until a forecasted period of 12 months as opposed to a conventional product.

Materials & Methods

A representative non-alcoholic drink (vermouth-like) was put in place at a volume of approx. 6 L. The bulk solution of said drink was treated with aseptic filtration before the bottling process. 8 aliquots of 700 ml of aseptically filtered bulk solution was transferred in 8 glass bottles in duplicates (i.e. 2×Bottle 1, 2, 3 and 4) containers i.e. the standard non-alcoholic drink container volume via the standard bottling process while the bottles were then sealed with the different type of pourer as described below:

2×Bottle 1 was sealed via a standard pourer found in the market, said pourer not having a filter;

2×Bottle 2 was sealed with a pourer that has a non-return valve and a filter as described in the present invention, wherein the filter was a PTFE membrane filter 2×Bottle 3 was sealed with a pourer that has a non-return valve and a filter as described in the present invention, wherein the filter was a PVDF membrane filter.

2×Bottle 4 was sealed with was sealed with a pourer that has a non-return valve and a filter as described in the present invention, wherein the filter was a PES membrane filter.

Storage/Testing/Results

The aseptically filtered bulk solution as well as the individual pourers and empty bottles were sampled and assessed for molds and yeasts comprising of the negative control for this study (Table 1).

TABLE 1

| Microorganisms Method ISO 21527-1-2008 | Specification (cfu/ml) | Bulk Solution | Empty Glass Bottles 700 ml volume | Conventional Caps | PTFE embedded caps | PVDF embedded caps | PES embedded caps |
|---|---|---|---|---|---|---|---|
| Molds | Acceptable $10^2 < 10^3$ Satisfactory $<10^2$ | <100 | <100 | <100 | <100 | <100 | <100 |
| Yeasts | Acceptable $10^2 < 10^3$ Satisfactory $<10^2$ | <100 | <100 | <100 | <100 | <100 | <100 |

Observations: The samples in Table 1 show to be free of microorganisms (mold & yeasts). "cfu" means colony forming unit.

Study Protocol Details

The study protocol was set up to resemble a normal serving lifecycle of a non-alcoholic drink container of 700 ml volume following multiple openings and up to a storage period of 12 months. More specifically

- each of 1×Bottle 1, 2, 3, 4 was placed under room temperature conditions and it was opened on daily basis serving 20 ml per day i.e. a representative of a single drink volume for an interval of 21 days.
- On the 22$^{nd}$ day each of 1×Bottle 1, 2, 3, 4 was left with a remaining volume of 280 ml i.e. [700 ml−(20 ml×21 days)=280 ml].
- Each bottle was then stored at 55° C. for 45 and 61 days so as to resemble room temperature self-storage for 9 and 12 months respectively.
- An appropriate sample of 100 ml was withdrawn from each bottle (Bottle 1, 2, 3, 4) after 45 and 61 days and assessed for microorganisms Molds & Yeasts according to ISO 21527-1-2008; the results from assessing said bottles are shown in Table 2:

TABLE 2

| Microorganisms Method ISO 21527-1-2008 | Specification (cfu/ml) | Bottle 1 Non-alcoholic solution contained in a bottles sealed with conventional cap | Bottle 2 Non-alcoholic solution contained in a bottles sealed with PTFE embedded caps | Bottle 3 Non-alcoholic solution contained in a bottles sealed with PVDF embedded caps | Bottle 4 Non-alcoholic solution contained in a bottles sealed with PES embedded caps |
|---|---|---|---|---|---|
| Molds | Acceptable $10^2 < 10^3$ | >750 (45 d) | <100 (45 d) | <100 (45 d) | <100 (45 d) |
|  | Satisfactory $<10^2$ | >1000 (61 d) | <100 (61 d) | <100 (61 d) | <100 (61 d) |
| Yeasts | Acceptable $10^2 < 10^3$ | >750 (45 d) | <100 (45 d) | <100 (45 d) | <100 (45 d) |
|  | Satisfactory $<10^2$ | >1000 (61 d) | <100 (61 d) | <100 (61 d) | <100 (61 d) |

Observations: Following multiple openings (21) the solution contained within Bottle 1 has shown to be heavily affected by microorganisms classifying their content quality as inappropriate for human consumption while bottles 2, 3, 4 show not to have been affected by the latter hence demonstrating sufficient preservation of the bottle content for a period resembling 9 & 12M (months) serving after first bottle opening.

Investigation:

In order to demonstrate the protective function of the pourers with the filters embedded therein, said pourers being applied on Bottles 2, 3 and 4 as opposed to unfiltered "dirty" air that is believed to be responsible for the findings in Bottle 1 after multiple openings, the following studies were held:

DNA Sequencing

DNA sequencing was performed on the microbial colonies developed from samples withdrawn from Bottle 1.

The identification revealed the presence of specific species of mold namely *Penicillium corylophilum* (mold), *penicillium crustosum* and yeast namely *Rhodotorula kratochvilovae* (*Rhodosporidium*).

*Penicillium corylophilum*: A mold developed in internal environments where it is transported with dust. In CYA (Czapek yeast extract agar) it creates colonies of 25-35 mm white-green color. In the MEA (malt extract agar) it develops rapidly and creates colonies with dark green color reverse yellow in front. Cold-fed fungus grows at 5° C. but not at 37° C. Excellent growth temperature 25° C. It is a dry-friendly fungus and grows up to a water activity of 0.8. It's sensitive to sorbic acid. It is not known to produce mycotoxins. No pathogenicity has been found for humans. It is also found in a variety of foods (jams, cereals, salami, dairy, nuts and frozen fruits), but also in mosquitoes for which it is also pathogenic. Finally, it is sensitive to pasteurization.

*Penicillium crustosum*: Yeast fungus very common in indoor environments. It has blue-green or blue-gray color in ACE or yellow in YGC. In CYA or MEA it grows rapidly and the colonies reach a diameter of 30-40 mm. Minimum growth temperature −2° C., excellent 25° C. and maximum growth temperature 30° C. The pH for growth ranges from 2.2-10 with an excellent 4.5-9.0. It effectively catabolizes sorbic acid, so it grows easily in foods that use it as a preservative. It also metabolizes chlorophenols to chloroanizoles and exceeds this preservative. Xerophilic fungus. As a fungus it spreads with spores in the air. It is isolated from a variety of foods such as cereals, meats, cold cuts and fish, bread, fruit juices, vegetables, melons, citrus fruits, apples, pears and dairy products (cheese, yogurt).

Some strains can produce toxins, mainly neurotoxins such as penitrem A. No pasteurization resistance has been reported but survival at high temperatures has been reported in large numbers [ref. 2].

*Rhodotorula kratochvilovae* (*Rhodosporidium*): A yeast belonging to Sporidiobolaceae family, commonly yeast. Aerobic microorganism. After 3 days in MALT agar the colonies have orange color while in YGC agar they are pink. It grows excellently at 25° C. It doesn't grow at 4° C. In terms of aw it needs at least 0.92 so it requires moisture. The smallest pH for growth is 2.2 Isolated from plants, water, soil, wood, air, fruits etc. It produces carotenoids. It cannot stand pasteurization. It is used as a biological agent against the fungi *Botrytis cinerea* and *Penicillium expansum* with which it competes. It's not considered a pathogen.

Sealed Bottles

The last part of the investigation pertained to the second set of 1×Bottle 1, 2, 3, 4 that were also stored sealed without first opening first at room temperature i.e. 25° C. resembling the conditions of shelf storage for 21 days, and then moved to 55° C. for 61 days i.e. to resemble shelf storage period of 12 months.

Bottle 1, 2, 3, 4 were opened and an appropriate sample was withdrawn and screened for microorganisms molds & yeasts according to ISO 21527-1-2008; the results from screening are shown in Table 3:

TABLE 3

| Microorganisms Method ISO 21527-1-2008 | Specification (cfu/ml) | Bottle 1 Non-alcoholic solution contained in a bottles sealed with conventional cap | Bottle 2 Non-alcoholic solution contained in a bottles sealed with PTFE embedded caps | Bottle 3 Non-alcoholic solution contained in a bottles sealed with PVDF embedded caps | Bottle 4 Non-alcoholic solution contained in a bottles sealed with PES embedded caps |
|---|---|---|---|---|---|
| Molds | Acceptable $10^2 < 10^3$ | <100 (45 d) | <100 (45 d) | <100 (45 d) | <100 (45 d) |
|  | Satisfactory <$10^2$ | <100 (61 d) | <100 (61 d) | <100 (61 d) | <100 (61 d) |
| Yeasts | Acceptable $10^2 < 10^3$ | <100 (45 d) | <100 (45 d) | <100 (45 d) | <100 (45 d) |
|  | Satisfactory <$10^2$ | <100 (61 d) | <100 (61 d) | <100 (61 d) | <100 (61 d) |

Observations: Non-alcoholic sealed bottles were found to be free of microorganisms following an interval of 12M resemblance of shelf storage.

CONCLUSION

It has been clearly demonstrated that the pourers (caps) that have therein embedded a hydrophobic filter comprising of the most representative type of membranes either PTFE, PVDF and PES membranes, have shown to be able to prevent the growth or appearance of microorganisms (yeast and molds) in the non-alcoholic (preservative free) drink environment.

The study was set up to resemble the serving life cycle of a non-alcoholic container applying daily serving as well as shelf storage up to an interval of 12 months. On the other hand, the conventional pourers (caps) that do not have said hydrophobic filters have failed to offer any protection to the non-alcoholic (preservative free) solutions, and consequently the latter have clearly developed microorganisms above the permitted level classifying these drinks as non-appropriate for serving and human consumption.

While the foregoing is directed to embodiments of the present invention, other and further embodiments of the invention may be devised without departing from the basic scope thereof. Those skilled in the art will understand that the embodiments disclosed here are non-limitative examples, and other embodiments are possible within the scope or the claims, for example but not limited to, different sequences of the method steps or different combinations of technical features.

NON-PAT LITERATURE REFERENCES

[ref. 1] Low Alcohol Descriptors Guidance, Department of Health and Social Care, UK, 13 Dec. 2018. available from: https://assets.publishing.service.gov.uk/government/uploads/system/uploads/attachment_data/file/763840/low-alcohol-descriptors-guidance.pdf
[ref. 2] Food Microbiology, Volume 55, May 2016, Pages 1-6

The invention claimed is:
1. A product, comprising:
a bottle that has a mouth;
a drinkable liquid inside said bottle, the drinkable liquid comprising a non-alcoholic version of an alcoholic drink, having a concentration by volume of alcohol in the range of 0% to less than 1.5%;
a pourer, wherein said pourer comprises a solid main body that is attached to said mouth, a flow channel at said main body, a check ball valve at said flow channel, and an air-vent channel at said main body, a filter at said air-vent channel; wherein
the flow channel and the check ball valve are configured for allowing, via the same, a flow of the drinkable liquid from inside the bottle towards outside the product under the action of gravity when the bottle is turned to a serving position for serving the drinkable liquid;
the air-vent channel is configured for allowing air from outside the product to pass inside the bottle via said air-vent channel during said flow of the drinkable liquid;
the filter is configured for producing a filtration of said air when the latter passes from outside the product to inside the bottle via said air-vent channel; and
the drinkable liquid is any of a non-alcoholic drink, an alcohol substitute drink, a low alcohol drink, an alcohol free drink, or a de-alcoholized drink.

2. The product according to claim 1, wherein the flow channel has a first cross section of a first area, and the air-vent channel has a second cross section of a second area that is larger than the first area.

3. The product according to claim 1, wherein the alcoholic drink is any of a gin, a whiskey, a rum, a tequila, a vermouth, a beer, a liqueur, an absinthe, an aquavit, a brandy, a cachaça, a calvados, a cider, a cognac, a jenever, a grappa, a mead, a mescal, a port, a sherry, a vodka, a wine, a whisky, or a bourbon.

4. The product according to claim 1, wherein the drinkable liquid comprises a temperance cocktail.

5. The product according to claim 1, wherein the filter comprises one of a polytetrafluoroethylene membrane, a polyvinylidene fluoride membrane, a polypropylene membrane, a polythersulfone membrane, or a combination thereof.

6. The product according to claim 1, wherein the concentration by volume of alcohol is less than 1.2%, less than 0.5%, or less than 0.05%.

7. The product according to claim 1, wherein the drinkable liquid is any of a non-alcoholic gin, a non-alcoholic whiskey, a non-alcoholic rum, a non-alcoholic tequila, a non-alcoholic vermouth, a non-alcoholic beer, a non-alcoholic liqueur, a non-alcoholic absinthe, a non-alcoholic aquavit, a non-alcoholic brandy, a non-alcoholic cachaça, a non-alcoholic calvados, a non-alcoholic cider, a non-alcoholic cognac, a non-alcoholic jenever, a non-alcoholic grappa, a non-alcoholic mead, a non-alcoholic mescal, a non-alcoholic port, a non-alcoholic sherry, a non-alcoholic vodka, a non-alcoholic wine, a non-alcoholic whisky, or a non-alcoholic bourbon, and wherein "non-alcoholic" signifies that in the non-alcoholic drink the concentration by volume of alcohol is in the range of 0 to less than 1.5%.

8. The product according to claim 1, wherein the filter is porous with a pore size of between 0.01 µm and 1 µm.

9. The product according to claim 1, wherein the drinkable liquid comprises any of n-propanol, isobutanol, acetic acid, active amyl alcohol, isoamyl alcohol, a juniper extract, a juniper macerate, a juniper flavor, an artemisia flavor, an artemisia extract, a wormwood extract, a phenol, a lactone, an acetal, a 3,8,8, trimethyl hydronapthalene isomer, furfural, isoamyl acetate, ethyl octanoate, ethyl decanoate, an aldonic acid, gluconic acid, sodium gluconate, and maltol.

10. The product according to claim 1, wherein the check ball valve has a movable member that is configured to move between an open position and a close position, and the flow channel and the check ball valve are configured for allowing via the same a flow of the drinkable liquid from inside the bottle towards outside the product when the movable member is at the open position, and are also configured for inhibiting a reverse flow via the same of the drinkable liquid when the movable member is at the close position, said reverse flow being opposite in direction to said flow.

11. The product according to claim 1 wherein the filtration is a sterile filtration.

12. The product according to claim 1, wherein the pourer comprises a protection flap that is proximal to the air vent channel.

13. The product according to claim 1, further comprising a mesh that is in the flow channel.

14. The product according to claim 1, wherein the check ball valve comprises a ball that comprises an antimicrobial material.

\* \* \* \* \*